Figure 1:
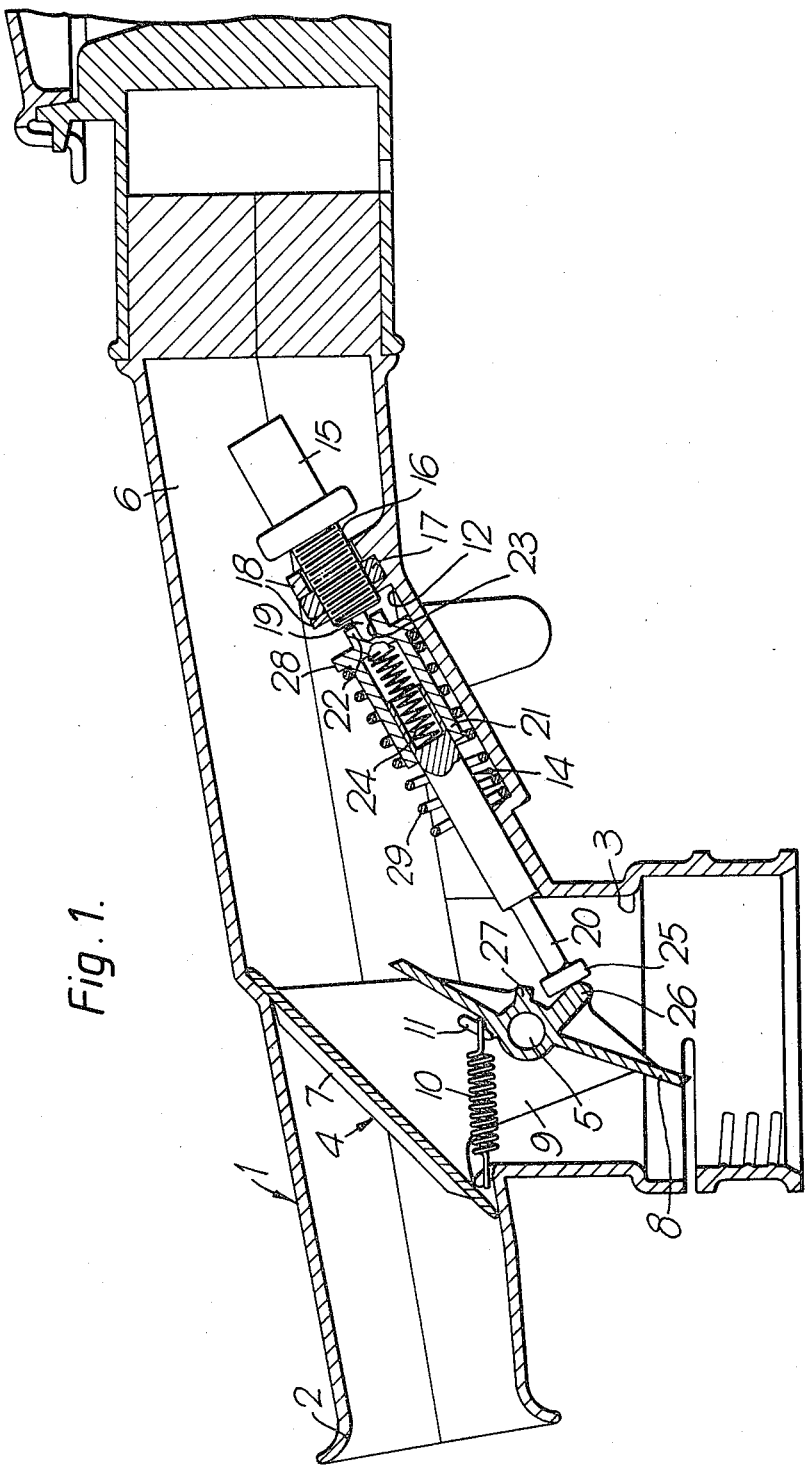

United States Patent [19]

Poore

[11] 4,340,172
[45] Jul. 20, 1982

[54] INTERNAL COMBUSTION ENGINE AIR INTAKE CONTROL SYSTEMS

[75] Inventor: Edward C. Poore, Hedge End, England

[73] Assignee: General Motors Limited, Dunstable, England

[21] Appl. No.: 238,973

[22] Filed: Feb. 27, 1981

[30] Foreign Application Priority Data

Mar. 10, 1980 [GB] United Kingdom ............... 8008045

[51] Int. Cl.³ .......................................... G05N 23/13
[52] U.S. Cl. ..................................... 236/13; 123/552
[58] Field of Search ................. 236/13; 123/556, 552; 137/871

[56] References Cited

U.S. PATENT DOCUMENTS

| 3,744,715 | 7/1973 | Maddocks | 236/13 |
| 3,801,078 | 4/1974 | Denton et al. | 123/552 X |
| 3,888,411 | 6/1975 | Florine | 236/13 |
| 3,913,544 | 10/1975 | Fyie | 123/556 X |
| 4,161,930 | 7/1979 | Bendig et al. | 123/122 D |
| 4,244,343 | 1/1981 | Yamaguchi et al. | 236/13 X |

FOREIGN PATENT DOCUMENTS 1277521 6/1972 United Kingdom .
1319892 6/1973 United Kingdom .

Primary Examiner—William E. Tapolcai, Jr.
Attorney, Agent, or Firm—C. K. Veenstra

[57] ABSTRACT

In an internal combustion engine air intake temperature control system a pivotal valve is movable between two extreme positions of angular movement to open one and close the other of a cold air inlet and a warm air inlet to an engine air intake passage, said valve being biased in a direction to close said cold air inlet, and a thermo-responsive device in said intake passage includes an actuator constructed so as, in response to increasing temperature in said intake passage, to engage said valve and move it against said bias to open said cold air inlet and close said warm air inlet, said valve also being movable to open said cold air inlet, against said bias, in response to a predetermined pressure differential across said valve, and said thermo-responsive device including a stop member constructed so that, when the temperature sensed by said thermo-responsive device is below a predetermined value, the stop member is positioned so as to prevent complete closure of said warm air inlet by said valve.

3 Claims, 3 Drawing Figures

INTERNAL COMBUSTION ENGINE AIR INTAKE CONTROL SYSTEMS

This invention relates to internal combustion engine air intake control systems, and in particular to a control system by which the temperature of the intake air can be regulated.

In an internal combustion engine air intake temperature control system according to the present invention a pivotal valve is movable between two extreme positions of angular movement to open one and close the other of a cold air inlet and a warm air inlet to an engine air intake passage, said valve being biased in a direction to close said cold air inlet, and a thermo-responsive device in said intake passage includes an actuator constructed so as, in response to increasing temperature in said intake passage, to engage said valve and move it against said bias to open said cold air inlet and close said warm air inlet, said valve also being movable to open said cold air inlet, against said bias, in response to a predetermined pressure differential across said valve, and said thermo-responsive device including a stop member constructed so that, when the temperature sensed by said thermo-responsive device is below a predetermined value, the stop member is positioned so as to prevent complete closure of said warm air inlet by said valve.

The thermo-responsive device preferably includes a wax-pellet power element, in which the expansion of a body of micro-crystalline wax in a housing, as the wax changes from the solid to the liquid state within a predetermined temperature range, effects the extension from the housing of pin or like member slidably sealed in the housing, the device being mounted in said intake passage and the pin engaging one end of said actuator, which is slidably mounted on the wall of the intake passage. A spring presses one end of the actuator into engagement with the pin of the thermo-responsive device, the other end of the actuator being engageable with the valve to move it from the open to the closed position with respect to the warm air inlet, the valve and the said other end of the actuator having cooperating formations which, in the positions of the rod corresponding to temperatures below a predetermined value, engage to prevent movement of the valve to fully close the warm air inlet.

A preferred embodiment of the invention is hereinafter described with reference to FIGS. 1 to 3 of the accompanying drawings which are vertical sections through a portion of an internal combustion engine air cleaner including an air intake temperature control system according to the invention, in three different modes of operation.

The drawings show the inlet tube 1 of an air cleaner in which a cold (ambient) air inlet 2 and a warm air inlet 3 are adapted to be opened or closed by the angular movement of a pivotal valve 4 mounted on a spindle 5 in the warm air inlet 3, which is formed as an integral lateral branch of the tube 1. The inlets 2 and 3 lead into an air intake passage 6 downstream of each, by which ambient air and/or warm air (taken, for example, from a position near the engine exhaust manifold) are delivered to the intake of the carburetor of an engine on which the air cleaner is mounted.

The valve 4 is formed with two valve flaps 7, 8 respectively controlling the cold and warm air inlets 2, 3, the flaps being interconnected by a web 9. A helical spring 10 is secured at one end to a lug 11 on the valve 4 and at its other end to the wall of the inlet 3 as to bias the valve 4 in a direction to close the cold air inlet 2 with flap 7 and open the warm air inlet 3 with flap 8.

The wall of the intake passage 6 is formed with an internal recessed portion 12 of "D" section to form the housing for an actuator 14 of a thermo-responsive device including a wax-pellet power element 15, the housing of which is threaded at one end 16 and screwed into a nut 17 located between a pair of arms 18 with apertures therein through which the housing 16 extends. The housing 16 can be rotated in the nut 17 for calibration of the device. A pin 19 is axially movable into and out of the housing 16 in response to contraction or expansion of the wax contained therein with temperature changes.

The actuator 14 comprises a piston 20 which is telescopically slidable within a recess in a socket 21, the base 22 of which is formed with an external centrally recessed boss 23 which receives the pin 19 of the power element 15. A helical compression spring 24 is housed within the recess in the socket 21, one end of the spring bearing against the base of the recess in the socket and the other end thereof abutting the base of a coaxial recess in the end of the piston 20 which is received within the socket, the compression spring 24 biasing the piston 20 outwardly from the recess in the socket 21.

The other end portion of the piston 20 is of reduced diameter and at its extremity is formed with a radially projecting annular stop member 25.

The face of the valve flap 8 remote from the valve flap 7 is formed with a substantially radially projecting abutment 26 constructed so as to be engageable by the stop member 25 of the piston 20.

Angularly displaced from the abutment 26 is a second abutment 27 which projects substantially radially by a smaller distance than the abutment 26 and is angularly spaced from the latter by a distance which is somewhat more than the thickness of the stop member 25.

The socket 21 is biased into engagement with the pin 19 by a helical compression spring 29, one end of which abuts an external shoulder 28 on the base 22 of the socket 21 and the other end of which abuts a seat at the end of the recessed portion 12 of the intake passage 6.

OPERATION

FIG. 1 shows the air cleaner with the temperature control system in the condition it assumes when an engine (not shown) to which it is fitted is started from cold. The flap 7 closes the cold air inlet 2 and flap 8 leaves the warm air inlet fully open, the actuator 14 being in the position shown in which the pin 19 of the power element 15 is fully retracted, as is the actuator 14.

Figure 2:
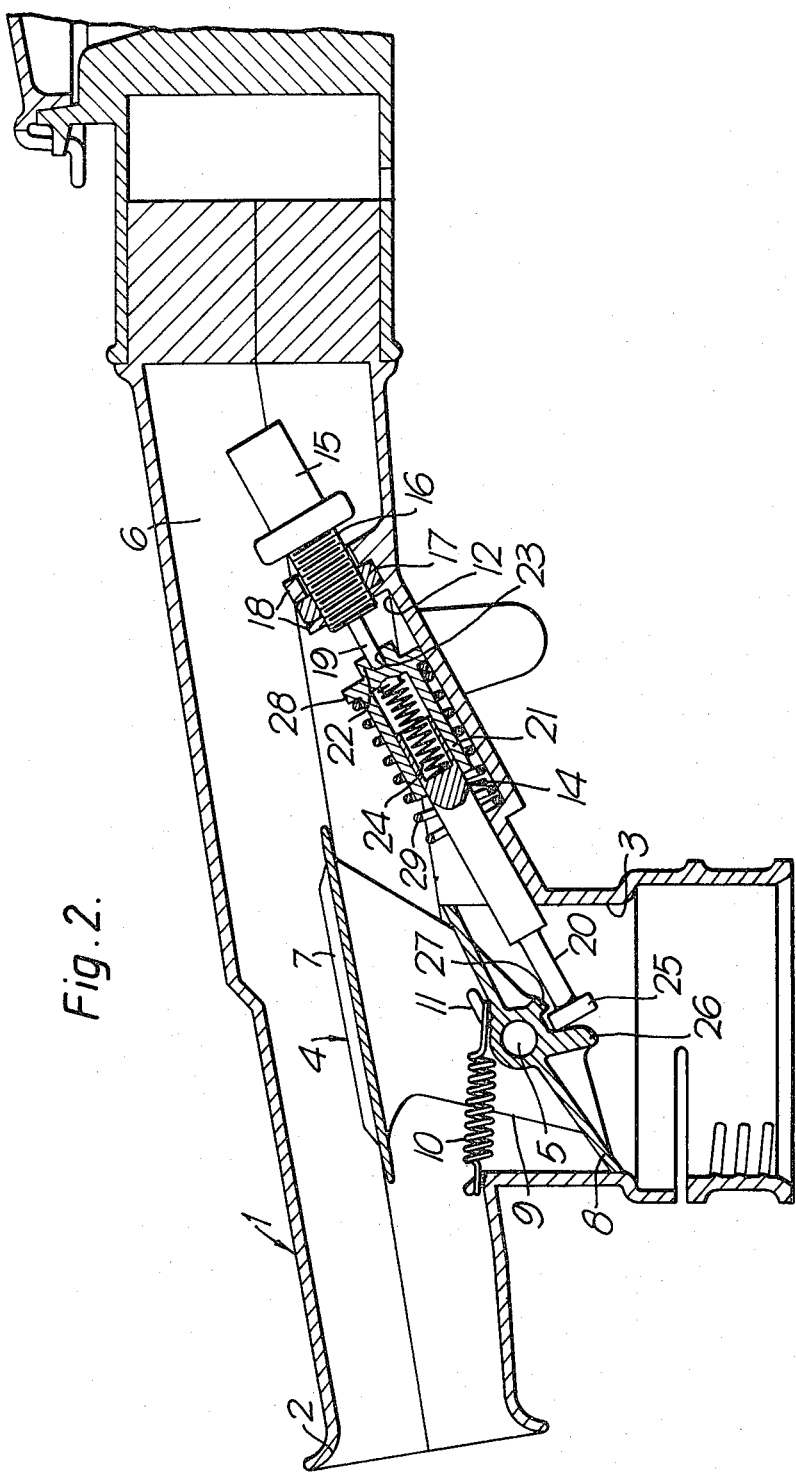

FIG. 2 shows the air cleaner in the "hot" condition, the temperature of the air entering the warm air inlet 3 and/or the cold air inlet 2, having caused the extrusion of the pin 19 from the power element housing 16 and consequent axial movement of the actuator 14 so that the abutment 26, which was in contact with the stop member 25 in the condition of the air cleaner shown in FIG. 1, has been angularly displaced about the axis of the spindle 5, against the bias of spring 10, by the longitudinal movement of the piston 20 under the action of the pin 19 upon extrusion from the housing of the power element 15. Accordingly, the valve 4 has been moved so that the valve flap 8 closes the warm air inlet 3 while the valve flap 7 has been brought into a position in which it is substantially in alignment with the longitudinal axis of the cold air inlet 2 and allows substantially unobstructed entry of ambient air through the inlet 2 and into the intake passage 6. During such pivotal movement the stop member 25, because of its engagement with the abutment 26, does not engage the abutment 27, the space between the two abutments having a clearance which is greater than the width of the stop member.

Figure 3:
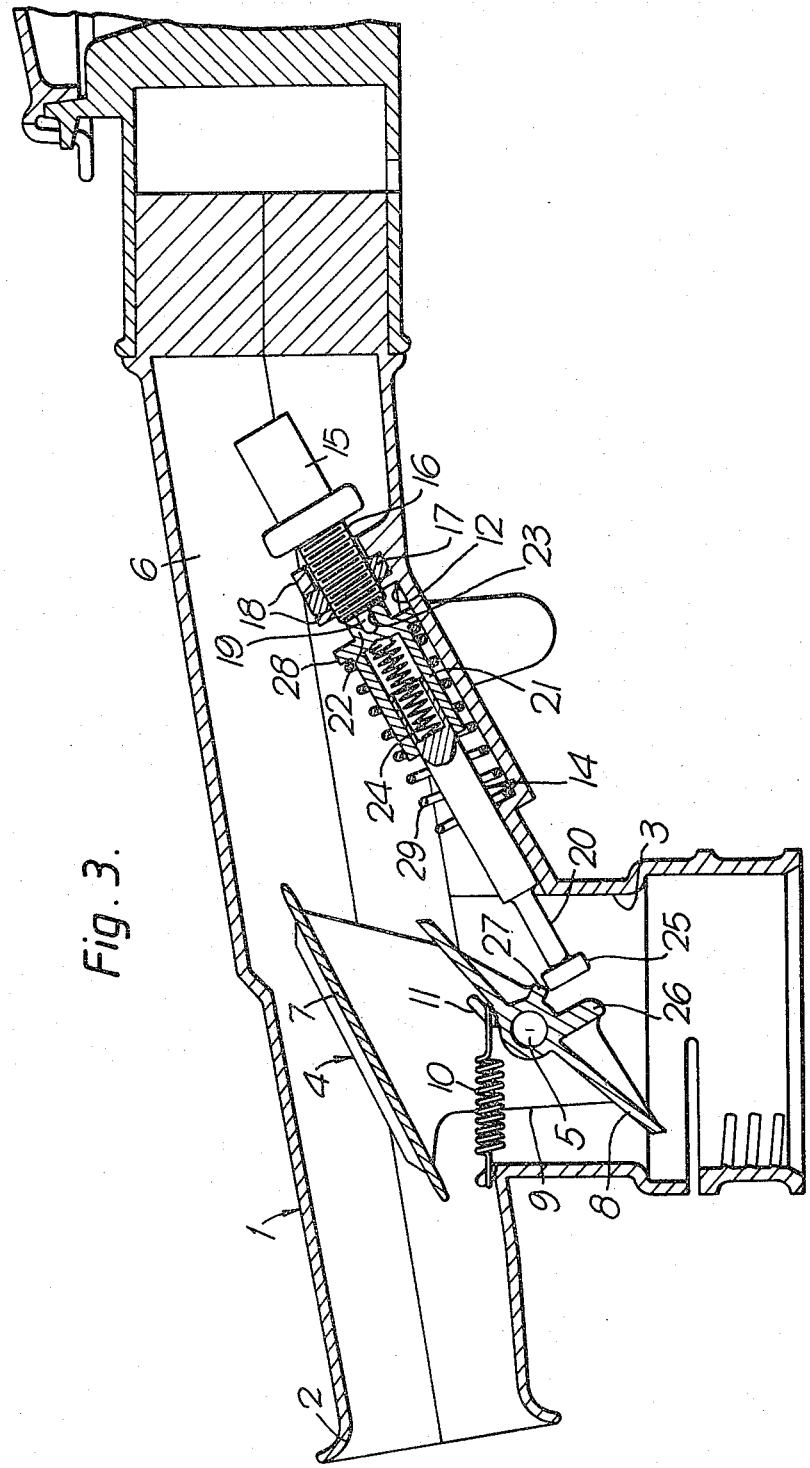

FIG. 3 shows the air cleaner in conditions—such as with full throttle operation of a cold engine—in which the actuator 14 is still retracted, allowing the flap 8 to open the warm air inlet 3, under the tension of the spring 10; however, under full throttle operation of the engine the pressure differential across the valve 4 is sufficient to overcome the tension of the spring 10 and pivot the valve 4 clockwise so that the valve flap 7 opens the cold air inlet 2. In such conditions the abutment 27 of the valve flap 8 abuts the stop member 25 and thus prevents full closure of the warm air inlet 3 by the flap 8. Thus, the cold air entering the inlet 2 has warm air admixed therewith, and "icing" of the carburetor with a cold engine under full throttle is prevented.

During subsequent longitudinal extension of the piston 20 from the socket 21 as the engine warms up, the stop member 25 will disengage from the abutment 27 and re-engage the abutment 27 to effect movement of the valve 4 in response to changes in temperature sensed by the thermo-responsive power element 15.

In the event that the extension of the pin 19 from the power element under high temperature conditions is more than sufficient to effect longitudinal extension of the piston 20 to fully close the warm air inlet 3 with the valve flap 8, the over-travel of the socket 21 in such conditions is permitted, without damage to the valve 4, by the compression of the spring 24 between the piston 20 and the socket 21.

I claim:

1. An internal combustion engine air intake temperature control system in which a pivotal valve is movable between two extreme positions of angular movement to open one and close the other of a cold air inlet and a warm air inlet to an engine air intake passage, said valve being biased in a direction to close said cold air inlet, and a thermo-responsive device in said intake passage includes an actuator constructed so as, in response to increasing temperature in said intake passage, to engage said valve and move it against said bias to open said cold air inlet and close said warm air inlet, said valve also being movable to open said cold air inlet, against said bias, in response to a predetermined pressure differential across said valve, irrespective of the valve position determined by the thermo-responsive device, and said thermo-responsive device including a stop member constructed so that, when the temperature sensed by said thermo-responsive device is below a predetermined value, the stop member is positioned so as to prevent complete closure of said warm air inlet by said valve under said pressure differential, in which said thermo-responsive device further includes a wax-pellet power element, in which the expansion of a body of microcrystalline wax in a housing, as the wax changes from the solid to the liquid state within a predetermined temperature range, effects the extension from the housing of a pin slidably sealed in the housing, the pin engaging one end of said actuator, which is slidably mounted on the wall of the intake passage, one end of said actuator being spring-biased into engagement with the pin of the thermo-responsive device, and the other end of the actuator being engageable with the valve to move it from the open to the closed position with respect to the warm air inlet, the valve and the said other end of the actuator having cooperating formations which, in positions of the actuator corresponding to temperatures below a predetermined value, engage to prevent full closure of the warm air inlet upon movement of the valve from the open position thereof relative to the warm air inlet, towards the closed position thereof, said cooperating formation portion of said actuator forming said stop member, in which said actuator includes a further spring which transmits the movement of said pin to effect movement of the actuator against said spring bias, but which yields when, under high temperature conditions, the extension of said pin is greater than that required to effect full closure of said warm air inlet by said valve.

2. An internal combustion engine air intake temperature control system according to claim 1, in which said actuator comprises a piston telescopically slidable within a socket, the base of said socket engaging said pin under said spring bias, and said further spring is comprised of a compression spring housed within the socket engaging one end of said piston, the other end of which is adapted to engage said valve.

3. An internal combustion engine air intake temperature control system according to claim 2, in which said other end of said piston is formed with a radially projecting annular configuration forming said stop member and a face of said valve is formed with substantially radially projecting abutments angularly spaced from each other by an amount such that said stop member is accommodated between said abutments, one of said abutments being engageable with said stop member to prevent complete closure of said warm air inlet by said valve when said actuator is in the position corresponding to a predetermined low temperature, said one abutment forming said cooperating formation portion of said valve.

* * * * *